United States Patent Office 3,407,184
Patented Oct. 22, 1968

3,407,184
PRODUCTION OF 1,3-DIENE POLYMERS IN AQUEOUS MEDIA
Herbert Naarmann, Ludwigshafen (Rhine), and Ernst-Guenther Kastning, Assenheim, Pfalz, Germany, assignors to Badische Anilin- & Soda-Fabrik Aktiengesellschaft, Ludwigshafen (Rhine), Germany
No Drawing. Filed Mar. 9, 1965, Ser. No. 438,397
Claims priority, application Germany, Mar. 14, 1964, B 75,907
The portion of the term of the patent subsequent to June 6, 1984, has been disclaimed
6 Claims. (Cl. 260—82.1)

ABSTRACT OF THE DISCLOSURE

This invention relates to the preparation of diene polymers in aqueous systems using (1) chelate complex compounds of transition metals of groups I, II, IV, or VIII of the Periodic System of Elements and (2) cycloalkenes as the catalysts.

---

This invention relates to a process for the production of 1,3-diene polymers by polymerization of 1,3-dienes in aqueous emulsion.

It is known that 1,3-dienes may be polymerized in aqueous emulsion using catalysts of compounds, stable in water, of transition metals of groups VII and VIII of the Periodic System (i.e., metals of groups VIIb and VIII of the Periodic Chart of the Elements, Handbook of Chemistry and Physics, 38th edition, page 394, Chemical Rubber Publishing Co., Cleveland, Ohio, U.S.A., 1956). To achieve economically tolerable conversions, very large amounts of catalyst are required, with reference to the polymer obtained, for example about 15 parts of catalyst for each 100 parts of polymer. It is also a disadvantage that the polymerization is seriously disturbed by very small amounts of oxygen.

It is also known that butadiene or mixtures of butadiene and styrene can be polymerized in aqueous emulsion using, 1,3-dicarbonyl compounds of divalent cobalt and peroxides. Even from conversions of about 20% however, 1,3-diene polymers are obtained which contain a considerable proportion of gel substances and it is difficult to control the polymerization.

It is an object of this invention to provide a process for the production of 1,3-diene polymers which have a particularly low gel content. Another object of this invention is to provide a process for the production of 1,3-butadiene and isoprene polymers which have a particularly low gel content. A further object of this invention is to provide an emulsion polymerization process for the production of 1,3-diene polymers which have a proportion having 1,2-combination which is smaller than the proportion having 1,2-combination in poly-1,3-dienes which have been prepared by conventional emulsion polymerization methods. Finally it is an object of this invention to provide a process for the polymerization of 1,3-dienes in which stabilizers for poly-1,3-dienes may be added to the reaction mixture prior to or during the polymerization.

We have found that 1,3-diene polymers can be prepared particularly advantageously by polymerization of 1,3-dienes using catalysts of (A) chelate complex compounds of transition metals of groups I and/or II and/or IV and/or VI to VIII of the Periodic System of Elements and
(B) cycloalkenes, by polymerizing 1,3-dienes in aqueous emulsion using conventional dispersants and, as chelate complex compounds, those of (a) monovalent and/or divalent copper, silver or mercury,
(b) monovalent and/or trivalent thallium,
(c) trivalent chromium manganese and cobalt,
(d) tetravalent cerium and titanium and/or
(e) divalent nickel, platinum and palladium with 1,3-dicarbonyl compounds.

The chelate complex compounds may be prepared by conventional methods by reaction of metal salts in which the metals are present in the suitable valency stages with 1,3-dicarbonyl compounds, for example as described by F. Gach in "Wiener Monatshefte," volume 21 (1900), page 89, and by G. Urbain and A. Debierne in "Compt. rend." volume 129 (1889), page 203, and also in "Inorganic Synthesis," volume 2, page 10 and volume 5, page 105. They may be used alone or in any desired mixtures with each other for the catalysts. Polynuclear chelate complex compounds may also be used.

Suitable 1,3-carbonyl compounds for the chelate complex compounds are preferably mesomeric organic compounds having molecular weights of 100 to 350 which exhibit a contributing structure having the grouping of the general formula:

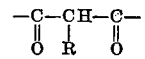

and a contributing structure having the grouping of the general formula:

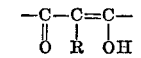

in which R preferably denotes a hydrogen atom or a hydrocarbon radical having one to five carbon atoms. The hydrocarbon radicals may be particularly saturated, linear and branched aliphatic substituents, such as the methyl, ethyl, propyl, isopropyl, butyl and isopentyl groups, which may also bear for example hydroxyl groups, halogen atoms and methoxy or ethoxy groups as substituents. Examples of suitable 1,3-dicarbonyl compounds for the chelate complex compounds are 1,3-ketones, such as acetylacetone, benzoylacetone and dibenzoylmethane, β-ketocarboxylic acids, such as acetoacetic acid and benzoylacetic acid, and their derivatives, particularly their esters with linear or branched alkanols containing one to five carbon atoms, such as methyl acetoacetate, ethyl acetoacetate, propyl acetoacetate, butyl acetoacetate, 3-methylbuten-(1)-ol-(3) acetoacetate, α-hydroxy-β-ketosuccinic acid and its esters with linear or branched alkanols having one to five carbon atoms, and β-ketoaldehydes, such as acetaldehyde and malonodialdehyde and other mesomeric compounds which in at least one contributing form exhibit 1,3-dicarbonyl structure, such as salicylic acid, esters of salicylic acid with alkanols containing one to five carbon atoms, for example methyl salicylate and butyl salicylate, and salicyl aldehyde. Mixtures of chelate complex compounds may also be used. The chelate complexes of metals in the said valency stages are not stable under the polymerization conditions. They change in the course of the polymerization and at the end of the same they are in a practically inactive form.

Examples of particularly suitable chelate compounds which may be used singly or mixed together are copper (II) acetoacetate, cobalt (III) acetylacetonate, manganese (III) benzoylacetone, cooper (II) malonodialdehyde, cerium (IV) dibenzoylmethane, chromium (III)-3-methylbutan-(1)-ol-(3) acetoacetate and thallium (I) acetylacetonate.

The cycloalkenes used as catalyst components are in general cycloaliphatic compounds having five to twelve ring carbon atoms. Cycloalkenes which contain two to four double bonds in the ring are of particular interest. Examples of suitable cycloalkenes are: cyclopentadiene, cyclohexadiene, cycloheptadiene, cyclooctatetraene, cyclooctadiene-(1,5), cyclooctadiene-(1,4), cyclooctadiene-(1,3), cyclododecatrienes-(1,5,9), for example cyclododecatriene-(1,5,9) (trans, trans, trans), cyclododecatriene-(1,5,9) (cis, trans, trans), and cyclododecatriene-(1,5,9) (cis, cis, cis), and cycloheptatriene. The ratio of metal chelate compound to cycloalkene in the mixture is of great importance for the catalytic activity of the catalysts. The range of good activity in general lies between 0.3 and 40 moles, preferably between 0.5 and 20 moles, of cycloalkene per mole of metal chelate complex compound. The molar ratio of cycloalkene to metal chelate compound is thus generally between 0.3:1 and 40:1, preferably between 0.5:1 and 20:1. When the ratio is less than 0.3 mole of cycloalkene per mole of chelate complex compound, the catalytic activity is only adequate in special cases. When more than 40 moles of cycloalkene is used per mole of chelate complex compound, polymers are usually obtained whose K-values are less than about 40 and which in general do not exhibit elastomeric properties.

The amount of catalyst mixture required is generally from 0.001 to 3% by weight, preferably from 0.01 to 1% by weight, with reference to the amount of monomers.

The temperature and pressure conditions in the process may be varied within wide limits. Polymerization is in general carried on at temperatures of from 0° to 100° C. and at pressures from atmospheric pressure to 16 atmospheres. In particular cases higher pressures and temperatures may be used. It is preferred to carry out the polymerization at temperatures of from 20° to 80° C.

Conventional dispersants, such as emulsifiers and protective colloids, may be used in the process. Examples of such dispersants are alkali metal salts of paraffin sulfonic acids or sulfonated alkylphenols, alkali metal salts of higher fatty acids or resin acids, dextranes, cellulose ethers and polyvinyl alcohols. Saturated and/or ethylenically unsaturated carboxylic acids having eight to thirty carbon atoms, such as oleic acid, stearic acid and linolenic acid, are preferred as dispersants. They are used in the amounts in which they are conventionally used for emulsion polymerization, for example from 0.5 to 20% by weight with reference to the polymer. The aqueous phase may additionally contain buffer substances, such as phosphates or compounds of the type of ethylenediamino tetracetic acid and/or regulators, for example dodecylmercaptan. Ethylenically unsaturated oily polymers, such as occur for example in the processing of petroleum by distillation and are available commercially for example under the name "naphthols," or also butadiene or isoprene oils, may also be present during the polymerization. These oily additives may be used in amounts of up to 25% by weight with reference to the polymer.

Open-chain 1, 3-dienes having four to ten carbon atoms, such as butadiene, isoprene, 2,3-dimethylbutadiene and 2-phenylbutadiene, may be polymerized singly or with each other in any proportions by the process according to this invention. Butadiene and isoprene are 1,3-dienes which have particular interest. Other ethylenically unsaturated compounds may be copolymerized with the dienes. The proportion of diene should be at least 50% by weight with reference to the whole of the monomers. Esters of α-ethylenically unsaturated monocarboxylic and dicarboxylic acids having three to four carbon atoms with linear or branched alkanols having one to ten, preferably one to four, carbon atoms are particularly suitable as ethylenically unsaturated compounds which may be used for the copolymerization in proportions of up to 50% by weight with reference to the whole of the monomers, such as the methyl, ethyl, propyl, n-butyl, isobutyl, tert-butyl, 2-ethylhexyl esters of acrylic, methacrylic, fumaric and maleic acids, and of the dicarboxylic acid esters, the ethyl and n-butyl esters are particularly suitable; other suitable comonomers are α-ethylenically unsaturated monocarboxylic and dicarboxylic acids having three and four carbon atoms, such as acrylic, methacrylic and maleic acids, and their nitriles, for example acrylonitrile, monovinylaromatic compounds having eight to ten carbon atoms, such as styrene and methylstyrenes, for example α-methylstyrene and o-vinyltoluene, vinyl ethers of linear and branched alkanols having one to five carbon atoms, such as vinyl methyl ether, vinyl n-butyl ether, such as methyl, ethyl, propyl, n-butyl, tert.butyl ether and vinyl isobutyl ether, and also vinyl esters of saturated carboxylic acids having two to four carbon atoms, particularly vinyl acetate and vinyl propionate.

The process may be carried out continuously or batchwise. When working continuously, the reactor may be for example a packed reactor, or up to about fifteen or more successive vessels may be used. Generally polymerization is carried on until there has been a conversion of about 70%. It is however also possible to continue polymerization to higher conversions, for example up to 90% or more. It is preferred to polymerize to conversions of only 55 to 60%.

It is particularly advantageous in the process to emulsify the catalyst components in a portion of the aqueous reaction medium and to supply the catalyst emulsion to the polymerization vessel. The individual components may however be added separately to the polymerization vessel.

It is a particular advantage of the process that compounds suitable for stabilizing poly-1,3-dienes, such as trinonylphenyl phosphite, which do not interfere with the polymerization, may be added to the polymerization mixture prior to or during the polymerization. In this way an optimum stabilizing effect can be achieved and subsequent incorporation of stabilizers, which is far more expensive, is avoided. The polymers are obtained in the form of an aqueous dispersion which generally contains from 5 to 50% by weight of the polymer. Before the polymer is precipitated, it is preferable to add to the dispersion a strong complex-forming compound which binds the metal ions of the catalyst in the form of stable water-soluble complex compounds. Alkali metal cyanides, alkali metal phosphates or compounds of the type of ethylene diamine tetracetic acid or its derivatives are particularly suitable for this purpose. Polymers which are practically free from catalyst and which optionally may be already stabilized are thus obtained without separate purification.

High molecular weight polymers whose K-values are in general from 50 to 150 are obtained by the process. They have a particularly low content of polymers having 1,2-combination, which is from about 5 to 15% by weight as compared with more than 20% by weight in the case of polymers which have been prepared by emulsion polymerization using peroxide catalysts. The polymers are suitable for example for the production of tires or as additives to other plastics, such as polyolefins.

The invention is further illustrated by the following examples in which the part specified are parts by weight. The K-values given therein are measured according to H. Fikentscher, Cellulosechemie, volume 13 (1932), page 58 in 1% solution in benzene, and the solution viscosities are measured in 5% solution in styrene with a capillary viscometer according to Ubbelohde.

Example 1

(a) 400 parts of water, 25 parts of a 20% aqueous solution of the sodium salt of a paraffin sulfonic acid having eight to twelve carbon atoms, 0.3 part of cobalt (III) acetylacetonate and 0.5 part of cyclooctadiene-(1,5) are placed in an autoclave. 95 parts of butadiene is added to the mixture while stirring. Polymerization is carried on for ten hours at 60° C. and a dispersion having a dry content of 10.8% by weight is obtained. This is equivalent to a conversion of 57.3%.

Then 0.25 part of trinonylphenyl phosphite is added to the dispersion as a stabilizer. After the polymer has been precipitated, processed and dried, it is soluble without gel formation in the conventional solvents and has a K-value of 87 and a solution viscosity of 57 centipoises. The Mooney plasticity ML–4′/100° C.′ (ASTM 927–57 T) is 39 and the Defo value at 30° C. is 1250/39, and at 80° C. is 635/37 (measured according to DIN 53,514).

(b) The butadiene is added gradually during the course of five hours while stirring to the catalyst dispersion, the other conditions being the same. A polymer dispersion is obtained having a dry content of 10.5% by weight. This is equivalent to a conversion of 56%. The K-value of the polymer is then 73 and its solution viscosity is 41 centipoises.

(c) The butadiene is emulsified in the aqueous phase and a mixture of the cobalt (III) acetylacetonate, cyclo-octadiene-1,5 and trinonylphenyl phosphite is added gradually during the course of five hours, the other conditions being the same. A dispersion is obtained which has a dry content of 13.2% by weight, equivalent to a conversion of 69%. The K-value of the polymer is then 99 and its solution viscosity is 140 centipoises.

(d) In addition to adding the catalyst mixture to the butadiene emulsion according to (c), 0.3 part of dodecyl-mercaptan is also added, the other conditions being the same. A dispersion of a polymer is obtained which has a K-value of 81 and a solution viscosity of 74 centipoises.

Example 2

Polymerization is carried out as in Example 1(a) but manganese (III) acetoacetate is used instead of cobalt (III) acetylacetonate as a catalyst component. Under otherwise the same conditions, a dispersion is obtained having a dry content of 17.9% by weight. This is equivalent to a conversion of 91%. The product obtained is not soluble without gel formation in some solvents. If 0.5 part of trinonylphenyl phosphite be added to the polymerization mixture prior to the commencement of the polymerization, however, a dispersion is obtained having a dry content of 17.4% by weight. The polybutadiene is in this case completely soluble without gel formation in the conventional solvents. The polymer contains less than 5 parts of heavy metals per million parts of polymer.

Example 3

Polymerization is carried out as described in Example 1(a) but a mixture of 95 parts of butadiene and 5 parts of styrene is used instead of butadiene and nickel (II)-acetoacetic acid ethyl ester is used instead of cobalt (III) acetylacetonate. A dispersion is obtained having a dry content of 11.4% by weight, equivalent to a conversion of 58%. The K-value of the polymer, which is soluble without gel formation in conventional solvents, is 79, its solution viscosity is 22 centipoises, its tensile strength at rupture is 235 kg./sq. cm. (measured according to DIN 53,504) and its elongation is 475% (measured according to DIN 53,504).

Example 4

Polymerization is carried out as described in Example 1(a) but a mixture of 95 parts of butadiene and 5 parts of vinyl ethyl ether is used instead of butadiene, and rhodium (III) benzoylacetonate is used instead of cobalt (III) acetylacetonate. A dispersion is obtained having a dry content of 11.2% by weight, equivalent to a conversion of 56.5%. 2 parts of β-naphthylamine is added during the polymerization. The K-value of the polymer, which dissolves without gel formation in conventional solvents, is 79 and its solution viscosity is 108 centipoises.

Example 5

500 parts of water, 40 parts of a 20% solution of the potassium salts of resin acids, 0.5 part of cobalt (III) salicylate, 5 parts of cyclooctatetraene, 100 parts of styrene and 300 parts of butadiene are added in the sequence given to an autoclave and polymerization is carried on for ten hours at 50° C. A dispersion is obtained which has a dry content of 24% by weight, equivalent to a conversion of 58%.

The K-value of the polymer, which is soluble without gel formation, is 79.5 and its solution viscosity is 112 centipoises.

Example 6

Polymerization is carried out as described in Example 5 but a mixture of 50 parts of styrene and 50 parts of acrylonitrile is used instead of 100 parts of styrene, and a mixture of equal parts of titanium (IV) acetylacetonate and ruthenium (III) acetylacetonate is used instead of the cobalt complex. A polymer dispersion is obtained having a dry content of 25.5% by weight, equivalent to a conversion of 59%.

Example 7

Into a packed reactor there are introduced continuously per hour:

(a) A mixture of 500 parts of water and 25 parts of a 25% solution of the sodium salt of a higher fatty acid having twelve to twenty carbon atoms, and (b) A mixture of 0.5 part of copper (I) acetoacetic acid-3-methylbuten-(1)-ol-(3) ester, 10 parts of cyclo-heptadriene, 1 part of trinonylphenyl phosphite and 120 parts of butadiene.

Polymerization is carried on at 35° C. and a mean residence time of the reaction mixture in the reactor of 1.5 hours. A dispersion is obtained which has a dry content of 10% by weight, equivalent to a conversion of 55%. The K-value of the polymer, which dissolves without gel formation, is 72 and its solution viscosity is 41 centipoises.

By polymerizing at 10° C. under otherwise the same conditions, a dispersion is obtained having a dry content of only 5.6%, equivalent to a conversion of 32%. The K-value of the polymer, which dissolves without gel formation, is then 67.5 and its solution viscosity is 38.5 centipoises.

We claim:

1. A process for the production of 1,3-diene polymers consisting essentially of polymerizing open-chain 1,3-dienes having four to ten carbon atoms in aqueous emulsion in contact with a catalyst consisting essentially of:

(A) at least one complex compound of a transition metal selected from the group consisting of monovalent copper, monovalent silver, monovalent mercury, monovalent thallium, divalent copper, divalent silver, divalent mercury, divalent nickel, divalent platinum, divalent palladium, trivalent thallium, trivalent rhodium, trivalent ruthenium, tetravalent cerium and tetravalent titanium with a mesomeric organic compound having a molecular weight of 100 to 350 and having a contributing structure from the group consisting of the general formula:

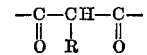

and the general formula:

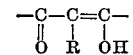

in which R denotes a substituent selected from the group consisting of hydrogen, hydrocarbon radicals having one to five carbon atoms and substituted hydrocarbon radicals having one to five carbon atoms, and (B) at least one cyclic unsaturated aliphatic hydrocarbon having from five to twelve carbon atoms in the ring.

2. A process for the production of 1,3-diene polymers consisting essentially of copolymerizing open-chain 1,3-dienes containing four to ten carbon atoms with up to 50% by weight (with reference to the total amount of monomers) of at least one monomer selected from the group consisting of α-ethylenically unsaturated monocarboxylic and dicarboxylic acids having three to four carbon atoms, nitriles thereof and esters thereof with alkanols having one to ten carbon atoms, monovinylaromatic compounds having eight to ten carbon atoms, vinyl ethers of alkanols having one to five carbon atoms and vinyl esters of carboxylic acids containing two to four carbon atoms, in aqueous emulsion in contact with a catalyst consisting essentially of:

(A) at least one complex compound of a transition metal selected from the group consisting of monovalent copper, monovalent silver, monovalent mercury, monovalent thallium, divalent copper, divalent silver, divalent mercury, divalent nickel, divalent platinum, divalent palladium, trivalent thallium, trivalent rhodium, trivalent ruthenium tetravalent cerium and tetravalent titanium with a mesomeric organic compound having a molecular weight of 100 to 350 and having a contributing structure from the group consisting of the general formula:

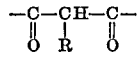

the general formula:

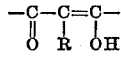

in which R denotes a substituent selected from the group consisting of hydrogen atoms, hydrocarbon radicals having one to five carbon atoms and substituted hydrocarbon radicals having one to five carbon atoms, and (B) at least one cyclic unsaturated aliphatic hydrocarbon having from five to twelve carbon atoms in the ring.

3. A process for the production of 1,3-diene polymers consisting essentially of polymerizing open-chain 1,3-dienes selected from the group consisting of butadiene and isoprene in aqueous emulsion in contact with a catalyst consisting essentially of:

(A) at least one complex compound of a transition metal selected from the group consisting of monovalent copper, monovalent silver, monovalent mercury, monovalent thallium, divalent copper, divalent silver, divalent mercury, divalent nickel, divalent platinum, divalent palladium, trivalent thallium, trivalent rhodium, trivalent ruthenium, tetravalent cerium and tetravalent titanium with a mesomeric organic compound having a molecular weight of 100 to 350 and having a contributing structure from the group consisting of the general formula:

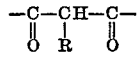

and the general formula:

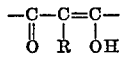

in which R denotes a substituent selected from the group consisting of hydrogen atoms, hydrocarbon radicals having one to five carbon atoms and substituted hydrocarbon radicals having one to five carbon atoms, and (B) at least one cyclic unsaturated aliphatic hydrocarbon having from five to twelve carbon atoms in the ring, the molar ratio of B:A being from 0.3:1 to 40:1 and the amount of $A+B$ being 1 to 3% by weight with reference to the monomers.

4. A process for the production of 1,3-diene polymers consisting essentially of copolymerizing open-chain 1,3-dienes selected from the group consisting of butadiene and isoprene with at least one monomer selected from the group consisting of α-ethylenically unsaturated monocarboxylic and dicarboxylic acids having three to four carbon atoms, nitriles thereof and esters thereof with alkanols having one to ten carbon atoms, monovinylaromatic compounds having eight to ten carbon atoms, vinyl ethers of alkanols having one to five carbon atoms and vinyl esters of carboxylic acids containing two to four carbon atoms, in aqueous emulsion in contact with a catalyst consisting essentially of:

(A) at least one complex compound of a transition metal selected from the group consisting of monovalent copper, monovalent silver, monovalent mercury, monovalent thallium, divalent copper, divalent silver, divalent mercury, divalent nickel, divalent platinum, divalent palladium, trivalent thallium, trivalent rhodium, trivalent ruthenium, tetravalent cerium and tetravalent titanium with a mesomeric organic compound having a molecular weight of 100 to 350 and having a contributing structure from the group consisting of the general formula:

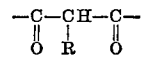

and the general formula:

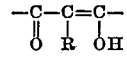

in which R denotes a substituent selected from the group consisting of hydrogen atoms, hydrocarbon radicals having one to five carbon atoms and substituted hydrocarbon radicals having one to five carbon atoms, and (B) at least one cyclic unsaturated aliphatic hydrocarbon having from five to twelve carbon atoms in the ring.

5. A process for the production of 1,3-diene polymers consisting essentially of polymerizing open-chain 1,3-dienes selected from the group consisting of butadiene and isoprene in aqueous emulsion in contact with a catalyst consisting essentially of:

(A) at least one complex compound of a transition metal selected from the group consisting of monovalent copper, monovalent silver, monovalent mercury, monovalent thallium, divalent copper, divalent silver, divalent mercury, divalent nickel, divalent platinum, divalent palladium, trivalent thallium, trivalent rhodium, trivalent ruthenium, tetravalent cerium and tetravalent titanium with a mesomeric organic compound having a molecular weight of 100 to 350 and having a contributing structure from the group consisting of the general formula:

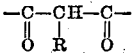

and the general formula:

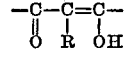

in which R denotes a substituent selected from the group consisting of hydrogen atoms, hydrocarbon radicals having one to five carbon atoms and substituted hydrocarbon radicals having one to five carbon atoms selected from the group consisting of 1,3-diketones, β-ketocarboxylic acid and their esters with alkanols having one to five carbon atoms, α-hydroxy-β-ketosuccinic acid and its esters containing one to five carbon atoms, β-ketoaldehydes, salicyclic acid and its esters with alkanols containing one to fiive carbon atoms and salicylaldehyde, and (B) a cyclic unsaturated aliphatic hydrocarbon having five to twelve carbon atoms in the ring, the molar ratio of B:A being from 0.3:1 to 40:1 and the amount of $A+B$ being from 0.001 to 3% by weight with reference to the monomers.

6. A process for the production of 1,3-diene polymers consisting essentially of copolymerizing open-chain 1,3-dienes selected from the group consisting of butadiene and isoprene with monomers selected from the group consisting of α-ethylenically unsaturated monocarboxylic and dicarboxylic acids having three to four carbon atoms, nitriles thereof and esters thereof with alkanols having one to ten carbon atoms, monovinylaromatic compounds having eight to ten carbon atoms, vinyl ethers of alkanols having one to five carbon atoms and vinyl esters of carboxylic acids containing two to four carbon atoms, in aqueous emulsion in contact with a catalyst consisting essentially of (A) at least one complex compound of a transition metal selected from the group consisting of monovalent copper, monovalent silver, monovalent mercury, monovalent thallium, divalent copper, divalent silver, divalent mercury, divalent nickel, divalent platinum, divalent palladium, trivalent thallium, trivalent rhodium, trivalent ruthenium, tetravalent cerium and tetravalent titanium with a mesomeric organic compound having a molecular weight of 100 to 350 and having a contributing structure from the group consisting of the general formula:

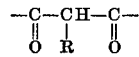

and the general formula:

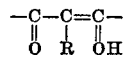

in which R denotes a substituent selected from the group consisting of hydrogen atoms, hydrocarbon radicals having one to five carbon atoms and substituted hydrocarbon radicals having one to five carbon atoms selected from the group consisting of 1,3-diketones, β-ketocarboxylic acid and their esters with alkanols having one to five carbon atoms, α-hydroxy-β-ketosuccinic acid and its esters containing one to five carbon atoms, β-ketoaldehydes, salicyclic acid and its esters with alkanols containing one to five carbon atoms and salicylaldehyde, and (B) a cyclic unsaturated aliphatic hydrocarbon having five to twelve carbon atoms in the ring, the molar ratio of B:A being from 0.3:1 to 40:1 and the amount of $A+B$ being from 0.001 to 3% by weight with reference to the monomers.

References Cited
UNITED STATES PATENTS

| | | | |
|---|---|---|---|
| 2,648,658 | 8/1953 | Vandenburg | 260—94.3 |
| 3,061,586 | 10/1962 | Vasseliff | 260—84.1 |
| 3,168,508 | 2/1965 | Canale | 260—94.3 |
| 3,220,999 | 11/1965 | Duck et al. | 260—94.2 |
| 3,226,376 | 12/1965 | Smith | 260—94.3 |
| 3,303,156 | 2/1967 | Dauby et al. | 260—29.7 |
| 3,324,092 | 5/1967 | Naarmann et al. | 260—94.3 |
| 2,933,474 | 4/1960 | Handy et al. | 260—29.7 |
| 2,605,242 | 7/1952 | Betts et al. | 260—29.7 |

FOREIGN PATENTS 583,219  10/1958  Italy.

MURRAY TILLMAN, *Primary Examiner.*

J. T. GOOLKASIAN, *Assistant Examiner.*

U.S. DEPARTMENT OF COMMERCE

UNITED STATES PATENT OFFICE
CERTIFICATE OF CORRECTION

Patent No. 3,407,184                                October 22, 1968

Herbert Naarmann et al.

It is certified that error appears in the above identified patent and that said Letters Patent are hereby corrected as shown below:

Column 1, line 44, "using," should read -- using --. Column 7, line 18, "ruthenium" should read -- ruthenium, --; line 26, "the general formula" should read -- and the general formula --. Column 10, line 17, "3,061,586" should read -- 3,061,596 --.

Signed and sealed this 21st day of April 1970.

(SEAL)
Attest:

Edward M. Fletcher, Jr.                    WILLIAM E. SCHUYLER, JR.
Attesting Officer                              Commissioner of Patents

UNAVAILABLE FOR FILMING